US008601520B2

(12) United States Patent
Yoshida et al.

(10) Patent No.: US 8,601,520 B2
(45) Date of Patent: Dec. 3, 2013

(54) INPUT AND OUTPUT SWITCHING DEVICE AND INPUT AND OUTPUT SWITCHING METHOD

(75) Inventors: Junji Yoshida, Osaka (JP); Makoto Funabiki, Osaka (JP); Tetsuya Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 55 days.

(21) Appl. No.: 13/280,639

(22) Filed: Oct. 25, 2011

(65) Prior Publication Data

US 2012/0042346 A1    Feb. 16, 2012

Related U.S. Application Data

(63) Continuation of application No. PCT/JP2011/002266, filed on Apr. 19, 2011.

(30) Foreign Application Priority Data

Apr. 20, 2010    (JP) ................................. 2010-097431

(51) Int. Cl.
     *H04N 7/18*      (2006.01)
(52) U.S. Cl.
     USPC ............................................. 725/80; 725/81
(58) Field of Classification Search
     USPC .................................................... 725/80, 81
     See application file for complete search history.

(56) References Cited

U.S. PATENT DOCUMENTS

| | | | | |
|---|---|---|---|---|
| 5,818,540 A * | 10/1998 | Mies et al. | ..................... | 348/559 |
| 5,983,192 A * | 11/1999 | Botzko et al. | ................. | 704/500 |
| 6,321,382 B1 * | 11/2001 | Wugofski | ........................ | 725/59 |
| 6,330,036 B1 * | 12/2001 | Murakami et al. | ............ | 348/555 |
| 6,757,913 B2 * | 6/2004 | Knox | ............................. | 725/153 |
| 6,975,844 B2 * | 12/2005 | Obitsu | ........................ | 455/193.1 |
| 7,646,432 B2 * | 1/2010 | Park et al. | ...................... | 348/565 |
| 7,653,344 B1 * | 1/2010 | Feldman et al. | ............. | 455/3.06 |
| 7,676,049 B2 * | 3/2010 | Melanson | ..................... | 381/303 |
| 7,720,234 B1 * | 5/2010 | Winslow et al. | ................ | 381/74 |
| 7,992,177 B2 * | 8/2011 | Perry et al. | ...................... | 725/81 |
| 8,281,346 B2 * | 10/2012 | Choi et al. | ...................... | 725/80 |
| 8,321,564 B2 * | 11/2012 | Palm et al. | ..................... | 709/225 |

(Continued)

FOREIGN PATENT DOCUMENTS

| | | |
|---|---|---|
| JP | 2007-258866 | 10/2007 |
| JP | 2009-130874 | 6/2009 |

(Continued)

OTHER PUBLICATIONS

HDMI Standard (High-Definition Multimedia Interface Specification Version 1. 3a), Nov. 10, 2006.

(Continued)

*Primary Examiner* — Brian Pendleton
*Assistant Examiner* — Jonathan V Lewis
(74) *Attorney, Agent, or Firm* — Wenderoth, Lind & Ponack, L.L.P.

(57) ABSTRACT

In the wireless HDMI converter, appropriate audio data input switching is performed, and, when an instruction is received, an audio data extraction unit extracts audio data from video and audio data received by an HDMI input interface from an STB, and an optical audio output interface outputs the extracted audio data to a home theater, thereby avoiding failure of wireless communication by a wireless interface or deterioration of the quality of such wireless communication.

11 Claims, 11 Drawing Sheets

(56) References Cited

U.S. PATENT DOCUMENTS

| | | |
|---|---|---|
| 2005/0166241 A1* | 7/2005 | Kim et al. ............... 725/81 |
| 2005/0259181 A1 | 11/2005 | Watanabe |
| 2007/0226769 A1 | 9/2007 | Waki |
| 2008/0168519 A1* | 7/2008 | Rao et al. ............... 725/127 |
| 2009/0135311 A1 | 5/2009 | Kurita et al. |
| 2009/0180755 A1 | 7/2009 | Kanemaru et al. |
| 2010/0053471 A1 | 3/2010 | Shikata et al. |
| 2010/0095342 A1* | 4/2010 | Gandhi et al. ........... 725/117 |
| 2010/0118193 A1* | 5/2010 | Boyden et al. ........... 348/554 |
| 2011/0072473 A1* | 3/2011 | Funabiki et al. ......... 725/81 |
| 2012/0204213 A1* | 8/2012 | Lau ............................ 725/74 |

FOREIGN PATENT DOCUMENTS

| | | |
|---|---|---|
| JP | 2009-171079 | 7/2009 |
| JP | 2009-182912 | 8/2009 |
| JP | 2009-253482 | 10/2009 |
| JP | 2009-260458 | 11/2009 |
| JP | 2010-57085 | 3/2010 |

OTHER PUBLICATIONS

WirelessHD Specification Overview, Aug. 27, 2009.

* cited by examiner

INPUT AND OUTPUT SWITCHING DEVICE AND INPUT AND OUTPUT SWITCHING METHOD

CROSS REFERENCE TO RELATED APPLICATION

This is a continuation application of PCT Patent Application No. PCT/JP2011/002266 filed on Apr. 19, 2011, designating the United States of America, which is based on and claims priority of Japanese Patent Application No. 2010-097431 filed on Apr. 20, 2010. The entire disclosures of the above-identified applications, including the specifications, drawings and claims are incorporated herein by reference in their entirety.

BACKGROUND OF THE INVENTION (1) Field of the Invention

The present invention relates to a technique for a network in which a display device such as a television, a reproduction device, and an audio output device are connected to each other via an input and output switching device. Specifically, video, etc. which is outputted by a device and displayed on the display device is viewed. The present invention relates to an input and output switching device which appropriately switches input of sound data according to which device is the device currently used for such viewing.

(2) Description of the Related Art

In recent years, improvement of picture quality and sound quality in AV devices has progressed such that, even in ordinary households, blu-ray disc (BD) players, set top boxes (STBs), and the like, have become popular and it has become possible to enjoy what is called high definition (HD) video.

Furthermore, with the widespread use of networks and HDMI (see High-Definition Multimedia Interface, Non-patent Reference I (HDMI Standard (High-Definition Multimedia Interface Specification Version 1.3a)), link functions which provide various added functions by having AV devices perform operations in conjunction with each other are becoming popular. Among such link functions, there is a function where, for example, when reproduction by the BD player is started, the power of a television turns ON and the input of the television, AV amplifier, and so on, automatically switches to the BD player. In other words, as a link function, there is a link function which, though the above-described switching, allows content reproduced by the BD player to be viewed simply, without having to operate the television, AV amplifier, and so on. Generally, such a function is called one-touch play.

In order to implement a link function such as the one-touch play, and so on, the HDMI Standard (Non-Patent Reference 1) defines a device control protocol referred to as Consumer Electronic Control (CEC).

Furthermore, in place of HDMI which is a wired interface, interfaces such as wireless HD (see Non-patent Reference 2 (Wireless HD Specification Overview) and so on) for transmitting HD video using wireless communication are becoming popular.

In order to allow such wired interfaces to be used by existing HDMI-compliant devices, there is a wireless HDMI converter which performs conversion between a wireless interface and HDMI.

An example of the operation of a wireless HDMI converter shall be described using FIG. 6 to FIG. 9.

FIG. 6 is a diagram showing an example of a configuration of an AV device network using a wireless HDMI converter 61 having one HDMI input (system 6).

FIG. 7 is a diagram showing an example of a configuration of the wireless HDMI converter 61 in FIG. 6.

First, the operation of the wireless HDMI converter 61 when viewing using a BD player 62, in the AV device network shown in FIG. 6 shall be described below.

An HDMI input interface 23a receives video and audio data 62d from the BD player 62, via an HDMI cable 15. Then, upon such receiving, the HDMI input interface 23a outputs the received video and audio data 62d to a wireless interface 71.

The wireless interface 71 transmits the outputted video and audio data 62d to a TV 11, using wireless communication. It should be noted that, at this time, the wireless interface 71 performs processing necessary for wireless communication such as, for example, establishing a connection with the TV 11, securing bandwidth, converting packet formats, and so on.

In this way, the video and audio (video and audio data 62d in FIG. 7) reproduced by the BD-player 62 (FIG. 6) can be viewed using the TV 11 (FIG. 6), via wireless communication.

FIG. 8 is a diagram showing an example of a configuration of an AV device network using a wireless HDMI converter 81 having one HDMI input and an optical audio output (system 8).

FIG. 9 is a diagram showing an example of a configuration of the wireless HDMI converter 81 in FIG. 8.

Furthermore, among wireless interfaces, there is a wireless interface that is capable of transmitting audio data in a direction opposite to the transmission direction of normal video and audio data. In this case, as shown in FIG. 8, for example, the wireless HDMI converter 81 and an AV amplifier 82 are connected using an optical audio cable 16.

Hereinafter, the operation of the wireless HDMI converter 81 in FIG. 8 shall be described using FIG. 9.

(i) Viewing Using the BD Player 62

The BD player 62 transmits the video and audio data 62d to the AV amplifier 82 via the HDMI cable 15.

Then, the AV amplifier 82 transmits the received video and audio data 62d to the wireless HDMI converter 81 via the HDMI cable 15. In addition, at this time, the AV amplifier 82 extracts the audio data inside the video and audio data 62d, and outputs the audio of the extracted audio data.

In the same manner as the HDMI input interface 23a of the wireless HDMI converter 61 shown in FIG. 7, upon receiving the video and audio data 62d from the BD player 62 via the HDMI cable 15, the HDMI input interface 23a of the wireless HDMI converter 81 outputs the received video and audio data 62d to the wireless interface 91.

The wireless interface 91 transmits the outputted video and audio data 62d to the TV 11, using wireless communication. It should be noted that, at this time, the wireless interface 91 performs processing necessary for wireless communication such as, for example, establishing a connection with the TV 11, securing bandwidth, converting packet formats, and so on.

(ii) Viewing Using the TV 11

The wireless interface 91 receives audio data 11d from the TV 11 using wireless communication, and outputs the received audio data 11d to an optical audio output interface 24. It should be noted that, at this time, the wireless interface 91 performs processing necessary for wireless communication such as, for example, establishing a connection with the TV 11, securing bandwidth, converting packet formats, and so on, in the same manner as in above-described (i).

The optical audio output interface 24 transmits the audio data 11d outputted by the wireless interface 91, to the AV amplifier 82 via the optical audio cable 16.

In this manner, it is possible to listen to audio using the AV amplifier 82 in either the case of viewing video and audio (video and audio data 62d) generated by the BD player 62 using the TV 11 ((i) described above), or the case of viewing using the TV 11 ((ii) described above).

FIG. 10 is a diagram showing an example of a network in which a home theater 14 and an STB 13 are present (system 10).

On the other hand, among BD players, there is a device which is called a home theater and includes the function of an AV amplifier. Generally, a home theater does not have an HDMI input. As such, a user that wants to use an STB (Set Top Box) and a home theater simultaneously adopts a connection configuration shown in FIG. 10. Specifically, an STB 13 and a home theater 14 are each connected to an HDMI input of a TV 101. Then, when viewing using the STB 13, the TV 101 extracts audio data 101d from audio and video data 13d received from the STB 13 via the HDMI cable 15, and transmits the extracted audio data 101d to the home theater 14 via the optical audio cable 16. It should be noted that Patent Reference 1 (Japanese Unexamined Patent Application Publication No. 2009-182912) describes a technique for extracting (separating) audio data.

It should be noted that, with regard to prior art, "Japanese Unexamined Patent Application Publication No. 2009-182912" is cited as Patent Reference 1. Furthermore, "HDMI Standard (High-Definition Multimedia Interface Specification Version 1.3a" is cited as Non-patent Reference 1. Furthermore, "Wireless HD Specification Overview" is cited as Non-patent Reference 2.

SUMMARY OF THE INVENTION

Consider the case of using wireless communication (wireless HDMI converters 61, and 81 in FIG. 6 to FIG. 9) in a network (system 10) in which the home theater 14 and the STB 13 are present, as shown in FIG. 10.

When the parts denoted as HDMI cable 15 are to be made wireless, there are cases where, depending on the wireless interface, the high-rate video and audio data 13d and the high-rate audio data 101d cannot be transmitted simultaneously due to bandwidth limitation. Specifically, when applying wireless communication to the system 10 in FIG. 10 in this manner, it is sufficient to transmit the audio data 101d from the TV 101 to the home theater 14 when viewing a TV program on the TV 101. However, when viewing using the STB 13, there is the problem that the two communication transmissions of the transmission of the video and audio data 13d from the STB 13 to the TV 101 and the transmission of the audio data 101d from the TV 101 to the home theater 14 cannot be performed simultaneously.

An object of the present invention is to provide, in a network in which a display device such as a television, a reproduction device, and a sound output device are connected to each other via an input and output switching device, an input and output switching device which appropriately switches input of audio data according to which of the devices is currently used in viewing on the display device.

In order to solve the above-described problem, the input and output switching device according to an aspect of the present invention includes: a first interface which is wirelessly connected to an external transmitting and receiving device, and at least transmits video data to, and receives audio data and a control signal from, the connected external transmitting and receiving device; a second interface which is connected to an external transmitting device, and at least receives video and audio data from the external transmitting device; a third interface which is connected to an external audio output device, and transmits audio data; an audio selector which switches a path through which the audio data is to be transmitted to the external audio output device; a control unit configured to instruct the audio selector to switch the path, based on the control signal received by the first interface; and an audio data extraction unit configured to extract audio data from the video and audio data received by the second interface, wherein, when a first instruction signal for selecting the first interface is received as the control signal (by a receiving unit of the input and output switching device): (a-i) the first interface receives the audio data from the external transmitting and receiving device, and outputs the received audio data to the audio selector; (a-ii) the control unit is configured to issue, to the audio selector, a first input selection instruction for selecting the first interface as an input of the audio selector; (a-iii) the audio selector outputs, to the third interface, the audio data outputted from the first interface, when the first input selection instruction is received from the control unit; and (a-iv) the third interface outputs, to the external audio output device, the audio data outputted by the audio selector, and when a second instruction signal for selecting the second interface is received as the control signal (by a receiving unit of the input and output switching device): (b-i) the second interface receives the video and audio data from the external transmitting device, and outputs the received video and audio data to the audio data extraction unit; (b-ii) the audio data extraction unit extracts the audio data from the video and audio data received from the second interface, and outputs the extracted audio data to the audio selector; (b-iii) the control unit is configured to issue, to the audio selector, a second input selection instruction for selecting the second interface as the input of the audio selector; (b-iv) the audio selector outputs, to the third interface, the extracted audio data outputted from the audio data extraction unit, when the second input selection instruction is received from the control unit; (b-v) the third interface outputs, to the external audio output device, the audio data outputted from the audio selector; and (b-vi) the first interface outputs, to the external transmitting and receiving device, the video and audio data received from the external transmitting device.

The present invention is capable of realizing appropriate automatic input switching of audio data according to which device is the device that is currently used for viewing on the display device.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Figure 1:
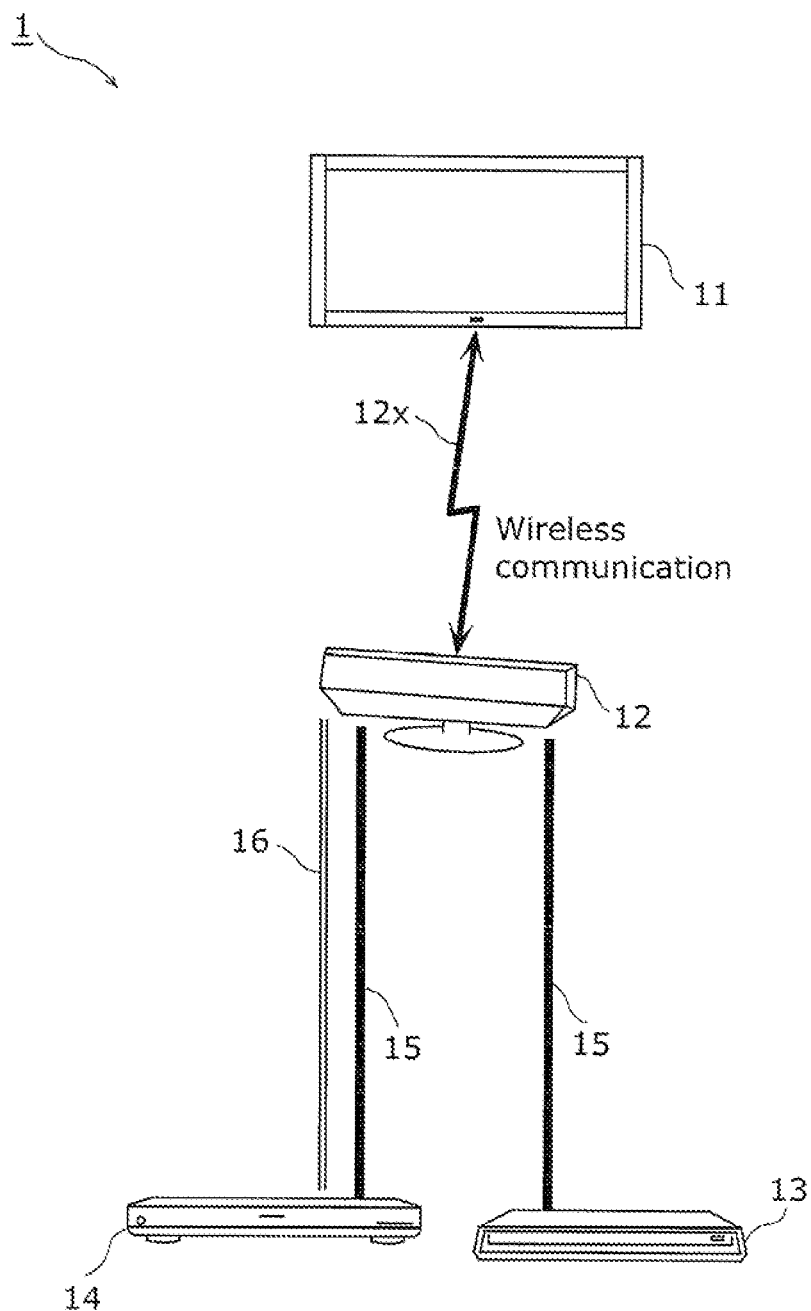
FIG. 1 is a diagram showing an example of a configuration of an AV device network according to Embodiment 1.

Hereinafter, embodiments of an input and output switching device according to the present invention shall be described in detail with reference to the Drawings.

The input and output switching device (wireless HDMI converter) according to the embodiments includes: a first interface (wireless interface 22) which is wirelessly connected to an external transmitting and receiving device (TV 11), and at least transmits video data (video and audio data 13d) to, and receives audio data (first audio data 11d1) and a control signal (control signal 11s) from, the connected external transmitting and receiving device; a second interface (HDMI input interface 23a, 23b (23)) which is connected to an external transmitting device (STB 13), and at least receives video and audio data (video and audio data 13d) from the external transmitting device; a third interface (optical audio interface 24, audio output unit 24x) which is connected to an external audio output device (home theater 14), and transmits audio data (audio data 11d); an audio selector (audio selector 27) which switches a path (see double line in FIG. 3 and FIG. 4) through which the audio data is to be transmitted to the external audio output device; a control unit (control unit 21) configured to instruct the audio selector to switch the path, based on the control signal received by the first interface; and an audio data extraction unit (audio data extraction unit 25a, 25b (25)) configured to extract audio data (second audio data 11d2) from the video and audio data received by the second interface.

Then, when a first instruction signal (first control signal 11s1) for selecting the first interface is received as the control signal (by (a receiving unit) of the input and output switching device): (a-i) the first interface receives the audio data (first audio data 11d1) from the external transmitting and receiving device, and outputs the received audio data to the audio selector; (a-ii) the control unit is configured to issue, to the audio selector, a first input selection instruction for selecting the first interface as an input of the audio selector; (a-iii) the audio selector outputs, to the third interface, the audio data (first audio data 11d1) outputted from the first interface, when the first input selection instruction is received from the control unit; and (a-iv) the third interface outputs, to the external audio output device, the audio data (first audio data 11d1) outputted by the audio selector.

Then, when a second instruction signal (second control signal 11s2) for selecting the second interface is received as the control signal (by (the receiving unit) of the input and output switching device): (b-i) the second interface receives the video and audio data to (video and audio data 13d) from the external transmitting device, and outputs the received video and audio data to the audio data extraction unit; (b-ii) the audio data extraction unit extracts the audio data (second audio data 11d2) from the video and audio data received from the second interface, and outputs the extracted audio data to the audio selector; (b-iii) the control unit is configured to issue, to the audio selector, a second input selection instruction for selecting the second interface as the input of the audio selector; (b-iv) the audio selector outputs, to the third interface, the extracted audio data (second audio data 11d2) outputted from the audio data extraction unit, when the second input selection instruction is received from the control unit; (b-v) the third interface outputs, to the external audio output device, the audio data (second audio data 11d2) outputted from the audio selector; and (b-vi) the first interface outputs, to the external transmitting and receiving device, the video and audio data (video and audio data 13d) received from the external transmitting device.

It should be noted that, here, in the embodiments, the wireless HDMI converter 12 (input and output switching device) includes, as basic constituent elements, a wireless interface 22, at least one HDMI input interface (HDMI input interface 23a, and so on), and an audio output unit (optical audio output interface (I/F) 24. It should be noted that, with regard to the optical audio output I/F 24, the audio output unit may perform outputting for an audio channel in the HDMI cable instead of the outputting for an optical cable (optical audio output I/F 24). Furthermore, the audio output unit may be an output unit connected using an audio signal transmission cable other than an optical cable.

In addition, the TV 11 and the wireless HDMI converter 12 may exchange signals using wireless communication (wireless HDMI). Moreover, the problem of not being able to transmit audio in both directions, in wireless HDMI, may be solved by the wireless HDMI converter 12. It should be noted that, in wireless communication other than wireless HDMI, when bi-directional communication of audio is not possible in such wireless communication, the wireless communication in the operation of the wireless HDMI converter 12 may be such wireless communication.

Specifically, for example, in the input and output switching device (wireless HDMI converter 12: FIG. 1 to FIG. 4, and so on), the external transmitting and receiving device is a television (TV 11) which displays high-definition (HD) video, the external audio output device (home theater 14) outputs audio included in video and audio which includes the video to be displayed by the television (TV 11), the input and output switching device is a wireless high-definition multimedia interface (HDMI) converter, the first interface (wireless interface 22: FIG. 2, and so on) performs wireless communication with the television (TV 11) using wireless HD, and causes the television (TV 11) to display video of the video data from the external transmitting device (STB 13) connected to the wireless HDMI converter using the HDMI, by wirelessly transmitting the video data of the video to the television (TV 11), the audio data extraction unit (audio data extraction unit 25a, 25b (25)) is configured to, when the video data is to be wirelessly transmitted, obtain the video and audio data (video and audio data 13d) including the video data, and extract the audio data (second audio data 11d2: FIG. 4) from the obtained video and audio data, the first interface (wireless interface 22) receives the audio data (first audio data 11d1) from the television (TV 11) by the wireless communication only when the video data is not to be wirelessly transmitted (FIG. 3), and does not receive the audio data when the video data is to be wirelessly transmitted, and the audio selector (audio selector 27) causes the external audio output device to output the audio data (first audio data 11*d*1) received from the television (TV 11) only when the video data is not to be wirelessly transmitted (FIG. 3), and cause the external audio output device to output the audio data (second audio data 11*d*2) extracted by the audio data extraction unit when the video data is to be wirelessly transmitted (FIG. 4).

Specifically, the first interface (wireless interface 22) may transmit, to the television (TV 11), the video data included in video and audio data (video and audio data 13*d*) received by the wireless HDMI converter 12 from the STB 13, by wirelessly transmitting the video and audio data to the television (TV 11), and causes the television (TV 11) to display the video of the transmitted video data, and the audio data extraction unit is configured to obtain the video and audio data (video and audio data 13*d*) received from the wireless HDMI converter 12, and extract the audio data (second audio data 11*d*2) from the obtained video and audio data.

Accordingly, transmission of audio data simultaneously with the transmission of video data, using the wireless communication 12*x* is avoided.

Accordingly, the simultaneous transmission leading to communication with low communication quality is avoided, and thus communication quality can be improved.

It should be noted that, by extension, the picture quality when the transmitted video data is displayed can be improved, and it is possible to avoid the outputting of the audio data to be transmitted which leads to low sound quality of the outputted audio data, thereby improving sound quality.

Furthermore, as described above, there is no need to perform simultaneous transmission (wireless communication) and a configuration for simultaneous transmission is unnecessary, and thus configuration can be simplified.

Detailed description follows.

(Embodiment 1)

Figure 2:
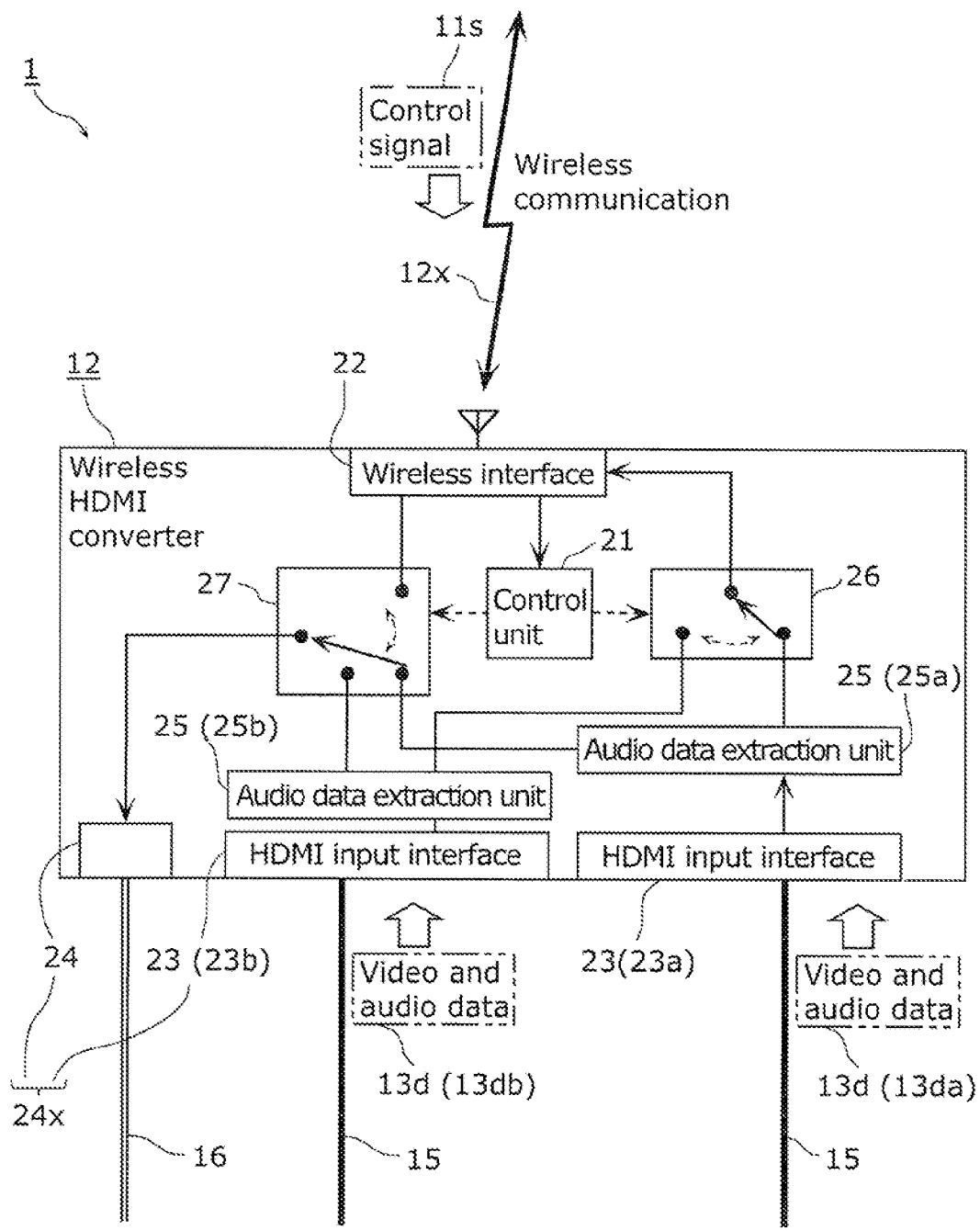
FIG. 2 is a diagram showing an example of a configuration of a wireless HDMI converter 12 in FIG. 1.

FIG. 1 is a diagram showing an example of a configuration of an AV device network (system 1) according to Embodiment 1.

FIG. 2 shows an example of a configuration of the wireless HDMI converter 12 in FIG. 1.

It should be noted that the wireless HDMI converter 12 is an example of the input and output switching device in Embodiment 1.

Hereinafter, the operation of the wireless HDMI converter 12 shall be described using FIG. 2.

Each of the HDMI input interfaces, namely, the HDMI input interface (first HDMI input interface) 23*a* and the HDMI input interface (second HDMI input interface) 23*b*, receives the video and audio data 13*d* (first video and audio data 13*da* or second video and audio data 13*db*) from a device (the STB 13 or the home theater 14) connected to the HDMI input interface.

The respective audio data extraction units, namely the audio data extraction unit (first audio data extraction unit) 25*a* and the audio data extraction unit (second audio data extraction unit) 25*b*, output, to the video and audio selector 26, the video and audio data 13*d* (video and audio data 13*da* or video and audio data 13*db*) received from the corresponding one of the HDMI input interface 23*a* and HDMI input interface 23*b*. Simultaneously with this output, the respective audio data extraction units extract audio data (see audio data 11*d*2 in FIG. 4) from the video and audio data 13*d*, and output the extracted audio data to the audio selector 27.

The video and audio selector 26 selects between the video and audio data 13*d* outputted from the audio data extraction unit 25*a* or the video and audio data 13*d* outputted from the audio data extraction unit 25*b*, according to an instruction from the control unit 21. Then, the video and audio selector 26 either outputs the selected video and audio data 13*d* to the wireless interface 22 or does not output any video and audio data 13*d*.

The audio selector 27 selects, according to an instruction from the control unit 21, one from among the audio data outputted from the audio data extraction unit 25*a*, the audio data extraction unit 25*b*, or the wireless interface 22. Then, the audio selector 27 outputs the selected audio data to the optical audio output interface 24. It should be noted that, specifically, the selected audio data is either the first audio data 11*d*1 (FIG. 3) from the TV 11 or the second audio data 11*d*2 (FIG. 4) extracted by the audio data extraction unit 25 (the first audio data extraction unit 25*a* or the second audio data extraction unit 25*b*).

The optical audio output interface 24 transmits the audio data (the first audio data 11*d*1 or the second audio data 11*d*2) selected by the audio selector 27 to the home theater 14 via the optical audio cable 16.

The wireless interface 22 is capable of performing each of the following operations (1) to (3), using wireless communication:

(1) Transmit the video and audio data 13*d* (FIG. 4) received from the video and audio selector 26 to the TV 11.

(2) Receive the audio data 11*d* (the first audio data 11*d*1, FIG. 3) from the TV 11, and output the received first audio data 11*d*1 to the optical audio output interface 24 via the audio selector 27.

(3) Receive the control signal 11*s* (FIG. 2 to FIG. 4) from the TV 11, and output the received control signal 11*s* to the control unit 21.

It should be noted that, at this time, the wireless interface 22 performs processing necessary for wireless communication such as, for example, establishing a connection with the TV 11, securing bandwidth, converting packet formats, and so on. However, (1) and (2) cannot be performed at the same time.

Figure 3:
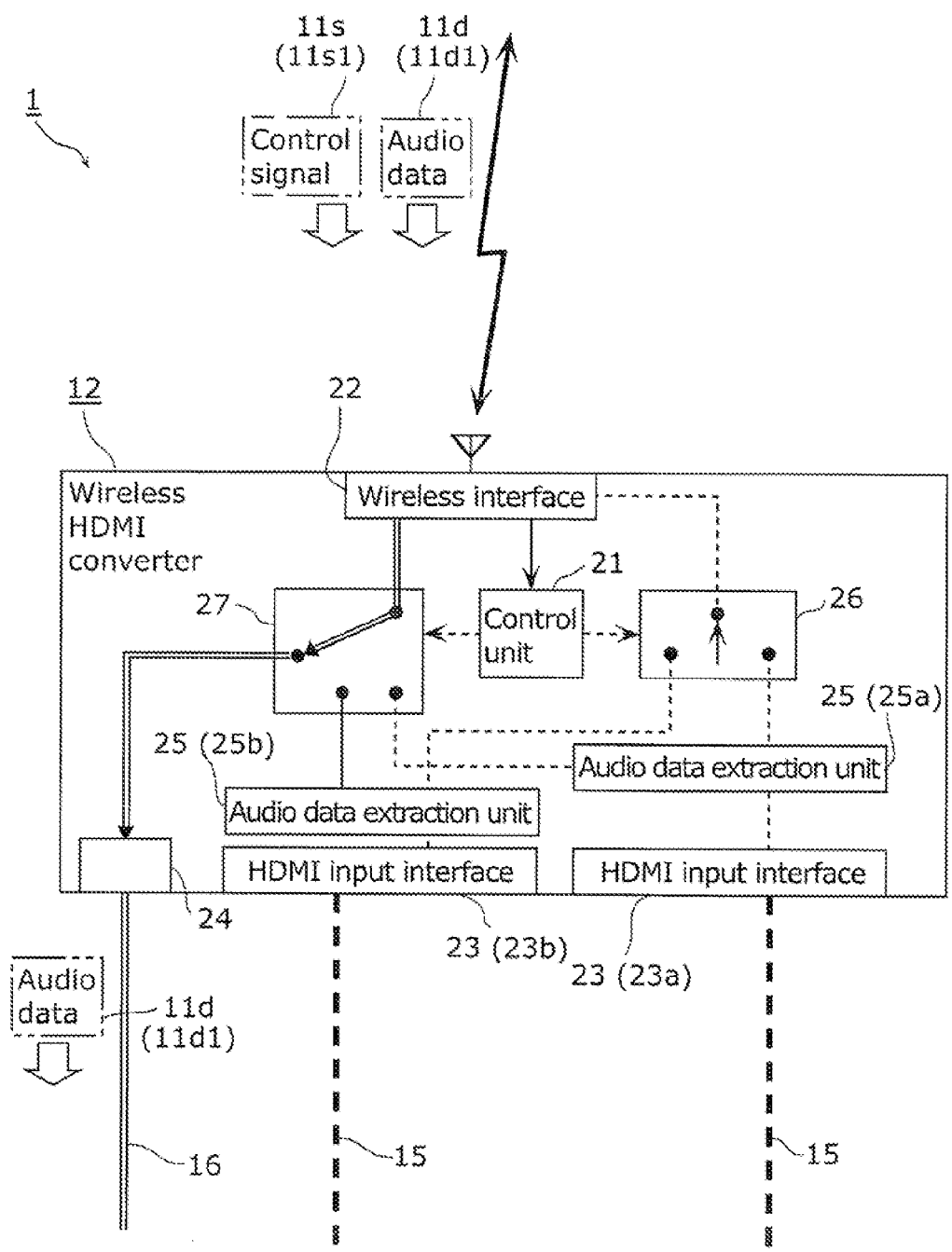
FIG. 3 is a diagram showing a data transmission path inside the wireless HDMI converter 12 during viewing using a TV 11.
Figure 4:
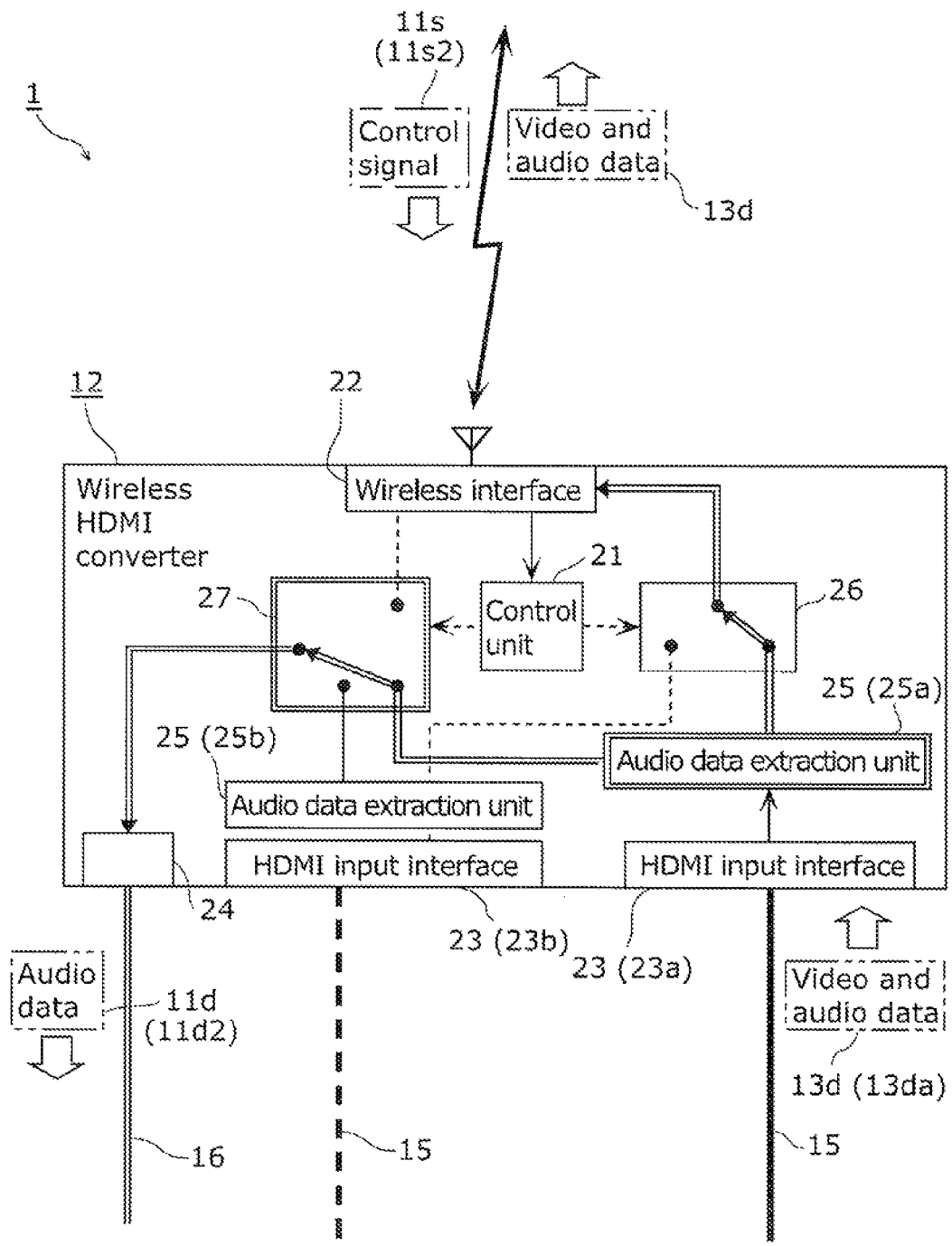
FIG. 4 is a diagram showing a data transmission path inside the wireless HDMI converter 12 during viewing using an STB 13.

FIG. 3 is a diagram showing a data transmission path inside the wireless HDMI converter 12 during viewing using the TV 11.

FIG. 4 is a diagram showing a data transmission path inside the wireless HDMI converter 12 during viewing using the STB 13.

Hereinafter, operations of the wireless HDMI converter 12 during viewing using each of the TV 11 and the STB 13 shall be described using FIG. 3 and FIG. 4.

(Operation when Viewing Using the TV 11)

The wireless interface 22 receives the first control signal 11*s*1 indicating that "viewing using the TV 11" is to be carried out, as the control signal 11*s* (FIG. 3), from the TV 11.

Subsequently, when the first control signal 11*s*1 is received, the control unit 21 issues, to the video and audio selector 26, an instruction not to output the video and audio data 13*d* (see FIG. 4) from the HDMI input interface 23 (the first HDMI input interface 23*a* or the HDMI input interface 23*b*). Then the control unit 21 issues, to the audio selector 27, an instruction to select the first audio data 11*d*1 from the TV 11 which is outputted from the wireless interface 22.

Furthermore, the wireless interface 22 starts receiving the first audio data 11*d*1 from the TV 11.

With this, the first audio data 11*d*1 transmitted from the TV 11 is transmitted from the wireless interface 22, passing through the audio selector 27 to the optical audio output interface 24 then to the home theater 14 via the optical audio cable 16.

As a result, when viewing using the TV 11 is started, the audio (sound) of first audio data 11*d*1 transmitted from the TV 11 to the home theater 14 via the wireless HDMI converter 12, is outputted from the home theater 14, as described above.

(Operation when Viewing Using the STB 13)

The wireless interface 22 receives the second control 11s2 indicating that "viewing using the device connected to the first HDMI input interface 23a" is to be carried out, as the control signal 11s, from the TV 11.

It should be noted that description is carried out for an example where, between the first HDMI input interface 23a and the second HDMI input interface 23b, the former is to be used.

Subsequently, when the second control signal 11s2 is received, the control unit 21 issues, to the video and audio selector 26, an instruction to select the video and audio data 13d outputted from the audio data extraction unit 25a. At the same time, the control unit 21 issues, to the audio selector 27, an instruction to select the second audio data 11d2 outputted from the audio data extraction unit 25a.

Furthermore, the wireless interface 22 starts the transmission of the video and audio data 13d to the TV 11.

With this, the second audio data 11d2 to be transmitted from the STB 13 to the wireless HDMI converter 12 (the second audio data 11d2 included in the video and audio data 13d to be transmitted) is transmitted from the HDMI input interface 23a, passing through the audio selector 27 to the optical audio output interface 24 then to the home theater 14 via the optical audio cable 16.

At the same time, the video and audio data 13 transmitted from the STB 13 is transmitted from the HDMI input interface 23a, passing through the audio selector 26 to the wireless interface 22 then to the TV 11.

As a result, when the viewing using the STB 13 is started, the video of the video and audio to be viewed is displayed on the TV 11 and, at the same time, the audio of such video and audio to be viewed is outputted from the home theater 14.

In this manner, for example, there are cases where, between the video (received using the tuner) of the TV 11 and the video of the device (the STB 13) connected using the HDMI, the second control signal 11s2 indicating that the latter is to be viewed, is received (the case of above-described (2)).

In this case, together with the video and audio data 13d from such device being transmitted to the TV 11, the second audio data 11d2 extracted from the video and audio data 13d may be selected by the audio selector 27.

In addition, in such a case as (2) described above, for example, one the first HDMI input interface 23a and the second HDMI input interface 23b may be selected using the second control signal 11s2, and so on.

Then, the video and audio data 13d (video and audio data 13da) may be transmitted to the TV 11 from the device (for example, the STB 13) connected to the selected HDMI input interface, and the audio data 11d2 from the video and audio data 13d may be selected by the audio selector 27.

With the above described operation, the audio (the audio of the first audio data 11d1 or the audio of the second audio data 11d2) of the device (the TV 11 or the STB 13) used for the current viewing is automatically selected from the home theater 14 and outputted.

It should be noted that although the number of HDMI input interfaces in the wireless HDMI converter 12 according to Embodiment 1 is two (the first HDMI input interface 23a and the second HDMI input interface 23b), the number need not be two.

Furthermore, the wireless HDMI converter 12 is an example of the input and output switching device according to Embodiment 1, and the interface used for input and output may be an interface that is of a type different from the above-described types. For example, it is possible to have the case where both the second HDMI input interface 23b and the home theater 14 are audio return channel (ARC)-compliant. For example, in such a case, the audio data may be transmitted to the home theater 14 via the ARC of the second HDMI input interface 23b instead of the optical audio output interface 24.

Furthermore, although the wireless HDMI converter 12 transmits the video and audio data 13d to the TV 11 via wireless communication, it is acceptable to transmit, to the TV 11, only the video data out of the video data and the audio data 11d2 in the video and audio data 13d.

It should be noted that the second control signal 11s2 may include selection data for selecting one out of the first HDMI input interface 23a and the second HDMI input interface 23b, and the HDMI input interface to be used may be selected according to the selection data.

(Embodiment 2)

The case (system 1a (FIG. 5) where a CEC-compliant wireless HDMI converter 51 is used as the input and output switching device in the AV device network in Embodiment 1 shall be described as Embodiment 2.

Figure 5:
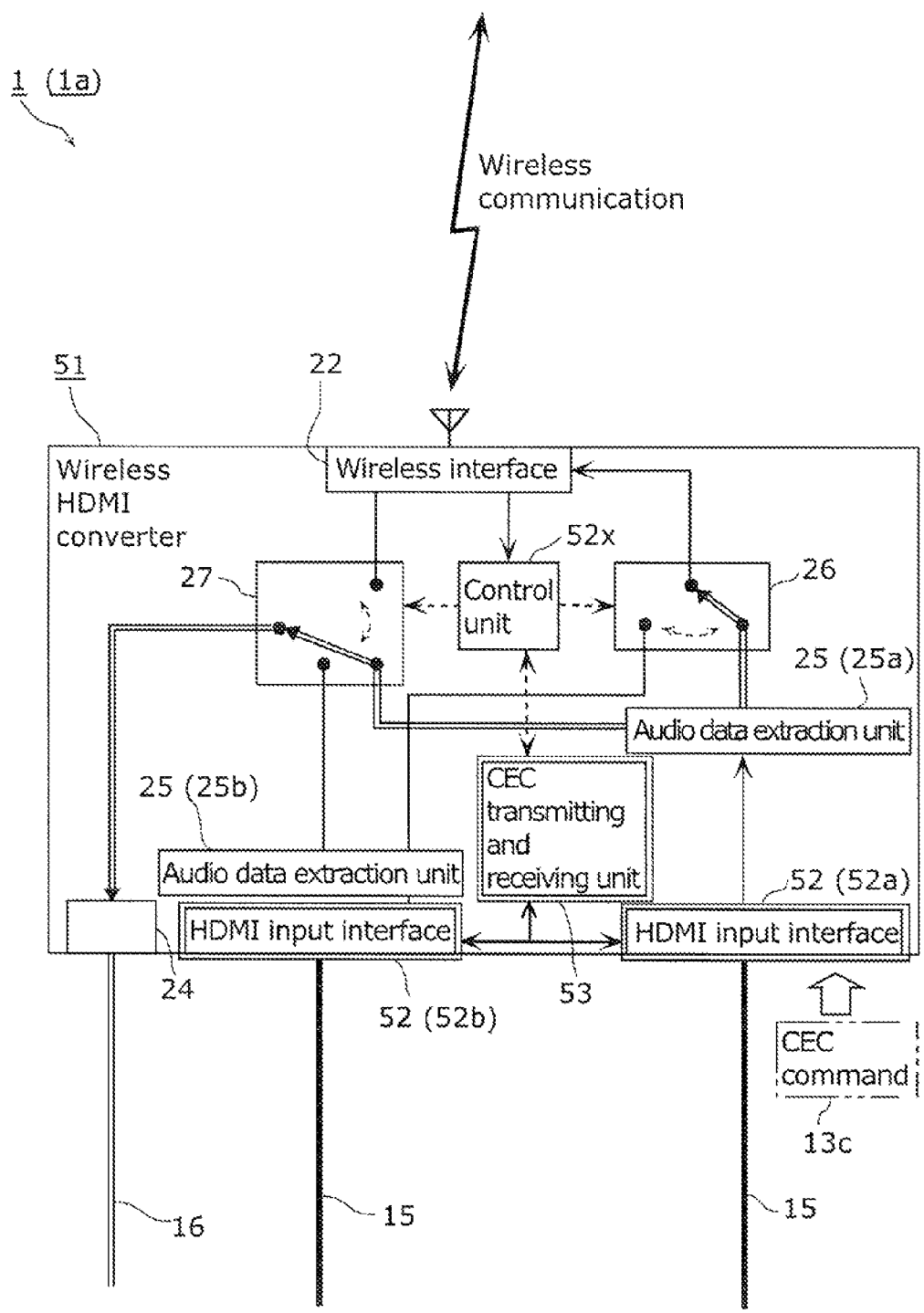
FIG. 5 is a diagram showing an example of a configuration of a wireless HDMI converter according to Embodiment 2.

FIG. 5 is a diagram showing an example of a configuration of the wireless HDMI converter 51 in Embodiment 2.

The wireless HDMI converter 51 includes two HDMI input interfaces. Each of the HDMI input interfaces is CEC-compliant. The two HDMI input interfaces are a first HDMI input interface 52a and a second HDMI input interface 52b.

In addition, the wireless HDMI converter 51 further includes a CEC transmitting and receiving unit 53. The CEC transmitting and receiving unit 53 performs transmission and reception of CEC commands with other devices such as the STB 13 or the home theater 14, via the first HDMI input interface 52a and the second HDMI input interface 52b.

Furthermore, a control unit 52x performs the following operation in addition to the previously described operations of the control unit 21 shown in FIG. 2. Specifically, upon receiving an input switching instruction from the CEC transmitting and receiving unit 53, the control unit 52x instructs the video and audio selector 26 and the audio selector 27 to perform input switching, in the same manner as when receiving the control signal 11s (describe previously) via the wireless interface 22.

By using CEC, it is possible, for example, when the power source of the STB 13 is turned ON, to automatically switch the input of the wireless HDMI converter 51 to the first HDMI input interface 52a that is connected to the STB 13. Specifically, when the power source of the STB 13 is turned ON, the STB 13 transmits, to the wireless HDMI converter 51, an <Active Source> command which is a CEC command for instructing input switching.

Subsequently, the CEC transmitting and receiving unit 53 receives the <Active Source> command via the first HDMI input interface 52a. In addition, upon receiving the command, the CEC transmitting and receiving unit 53 instructs the control unit 52x as to which HDMI input interface (the first HDMI input interface 52a) is the HDMI input interface to which the transmission source device of the <Active Source> command is connected. With this, the control unit 52x instructs the video and audio selector 26 and the audio selector 27 to select the first HDMI input interface 52a that has been instructed.

It should be noted that the operations other than that described above are the same as those in the wireless HDMI converter 21 according to Embodiment 1.

With the above described operation, the audio of the device to be used for the current viewing is automatically selected and outputted from the home theater 14.

It should be noted that although the number of HDMI input interfaces in the wireless HDMI converter 51 according to Embodiment 2 is two, the number does not have to be two.

Furthermore, the wireless HDMI converter 51 is an example of the input and output switching device according to Embodiment 2, and the interface used for input and output may be an interface of different type. For example, it is possible to have the case where both the second HDMI input interface 52*b* and the home theater 14 are audio return channel (ARC)-compliant. In such a case, the audio data may be transmitted to the home theater 14 via the ARC of the second HDMI input interface 52*b* instead of the optical audio output interface.

Furthermore, although the wireless HDMI converter 51 transmits the video and audio data 13*d* to the TV 11 via wireless communication, it is acceptable to transmit only the video data of the video and audio data 13*d*.

In summary, an input and output switching device is provided which performs appropriate input switching according to which device is currently used in the viewing on the display device (TV 11) (according to whether or not it is the device (STB 13, or the like) connected to the wireless HDMI converter 12 by HDMI), in a network (system 1, system 1*a*) in which a display device (TV 11) such as a television, a reproduction device (STB 13), and an audio output device (home theater 14) are connected to each other via an input and output switching device (wireless HDMI converter 12, 51).

Specifically, the wireless interface 22 performs the following operation upon receiving, from the TV 11, a control signal (first control signal 11*s*1) indicating "viewing using the TV 11", as the control signal 11*s*.

Specifically, the control unit 21 issues, to the video and audio selector 26, an instruction not to output the video and audio data (the video and audio data 13*d*), and, at the same time, issues, to the audio selector 27, an instruction to select the audio data (the first audio data 11*d*1) outputted from the wireless interface 22. As a result, when viewing using the TV 11 is started, the audio (sound) of first audio data 11*d*1 from the TV 11 is outputted from the home theater 14.

Furthermore, the wireless interface 22 performs the following operation upon receiving, from the TV 11, a signal (the second control 11*s*2) indicating "viewing using the device connected to the first HDMI input interface 23*a*", as the control signal 11*s*.

Specifically, at this time, the control unit 21 issues, to the video and audio selector 26, an instruction to select the video and audio data (the video and audio data 13*da*) outputted from the audio data extraction unit 25*a*, and, at the same time, issues, to the audio selector 27, an instruction to select the audio data outputted from the audio data extraction unit 25*a*. As a result, when the viewing using the STB 13 is started, the video of the video and audio from the STB 13 which is to be viewed is displayed on the TV 11 and, at the same time, the audio of such video and audio is outputted from the home theater 14.

In this manner, for example, the following operation may be performed. However, the subsequent description is merely an example.

Specifically, the display device (TV 11) may display the video in the video and audio.

It should be noted that, in recent years, there are many cases where the video to be displayed is a high-definition (HD) video and thus the data amount thereof is large.

In addition, the audio output device (home theater 14) may output the audio (the audio data 11*d*) in the video and audio of the video to be displayed using the display device.

Figure 10:
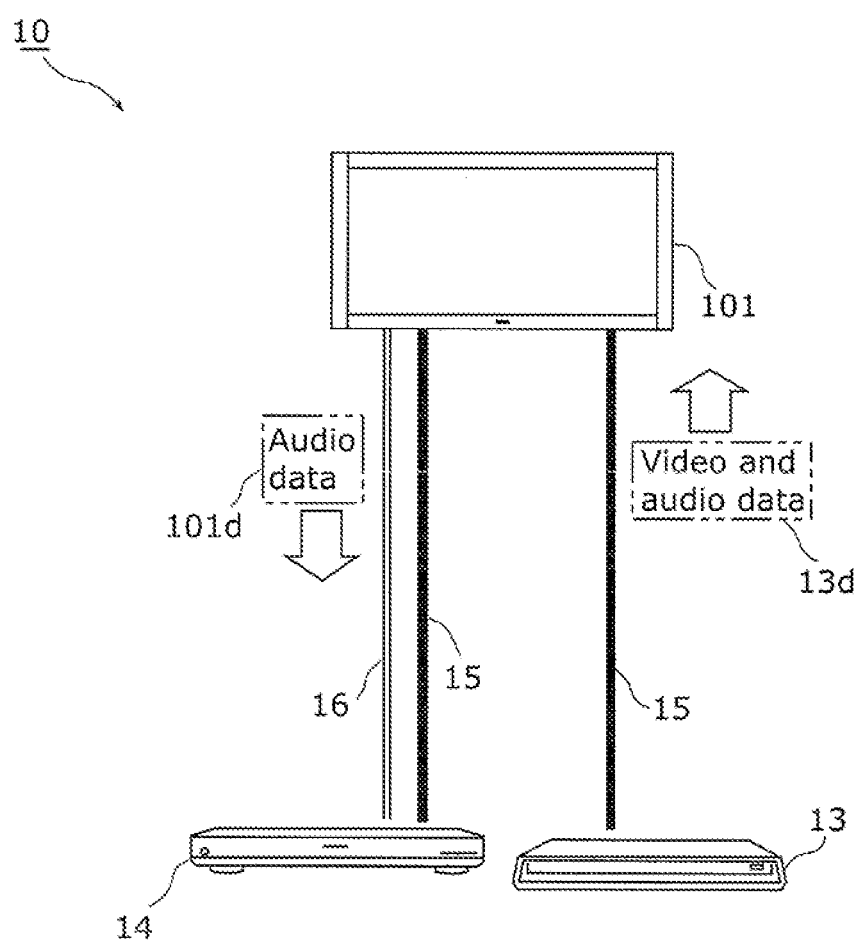
FIG. 10 is a diagram showing an example of a network in which a home theater and an STB are present.

Here, for example, the display device may display the video in video and audio such as the video and audio received through a tuner provided to the display device (TV 11). In addition, together with performing such display, the display device may extract, from the video and audio, the audio (the first audio data 11*d*1 (FIG. 3), the audio data 101*d* in FIG. 10) in such video and audio, and cause the audio outputting device (home theater 14) to output the extracted audio.

Figure 6:
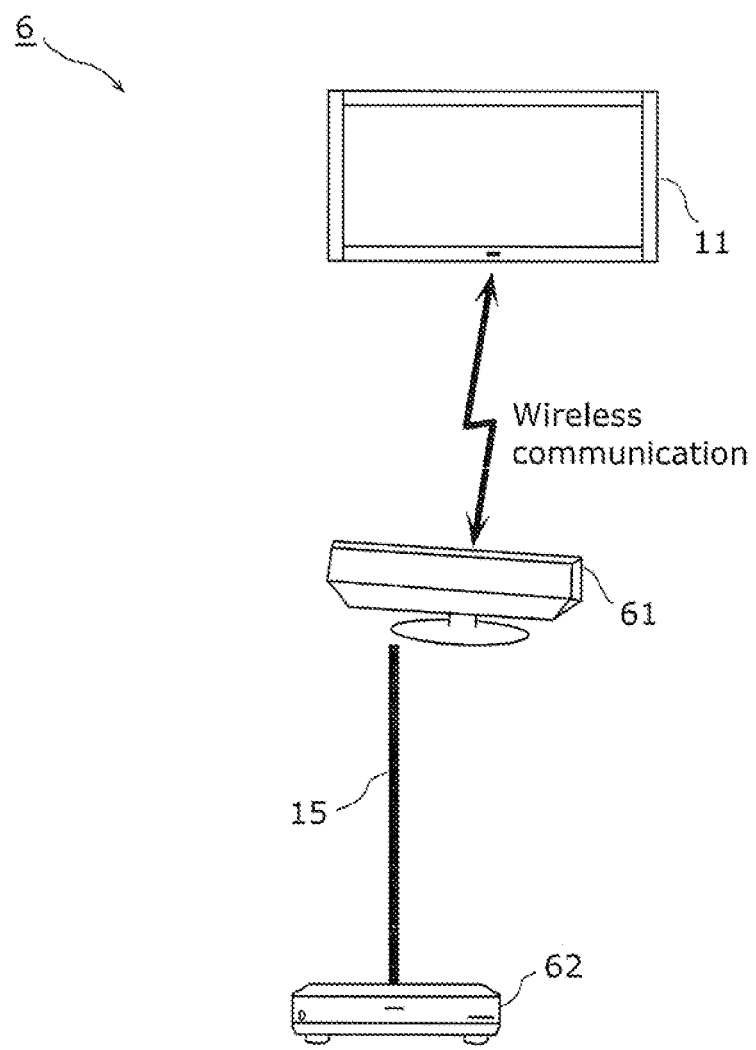
FIG. 6 is a diagram showing an example of a configuration of an AV device network using a wireless HDMI converter having one HDMI input.
Figure 7:
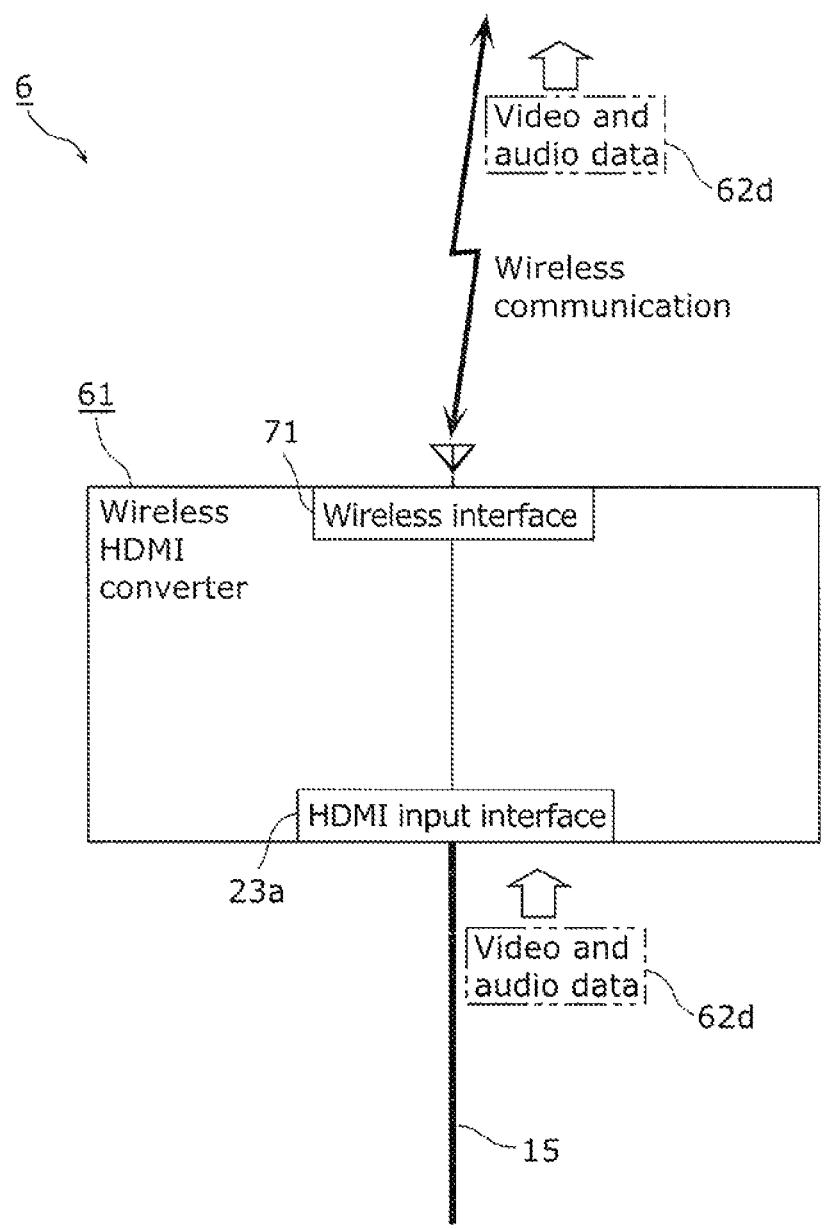
FIG. 7 is a diagram showing an example of a configuration of the wireless HDMI converter in FIG. 6.
Figure 8:
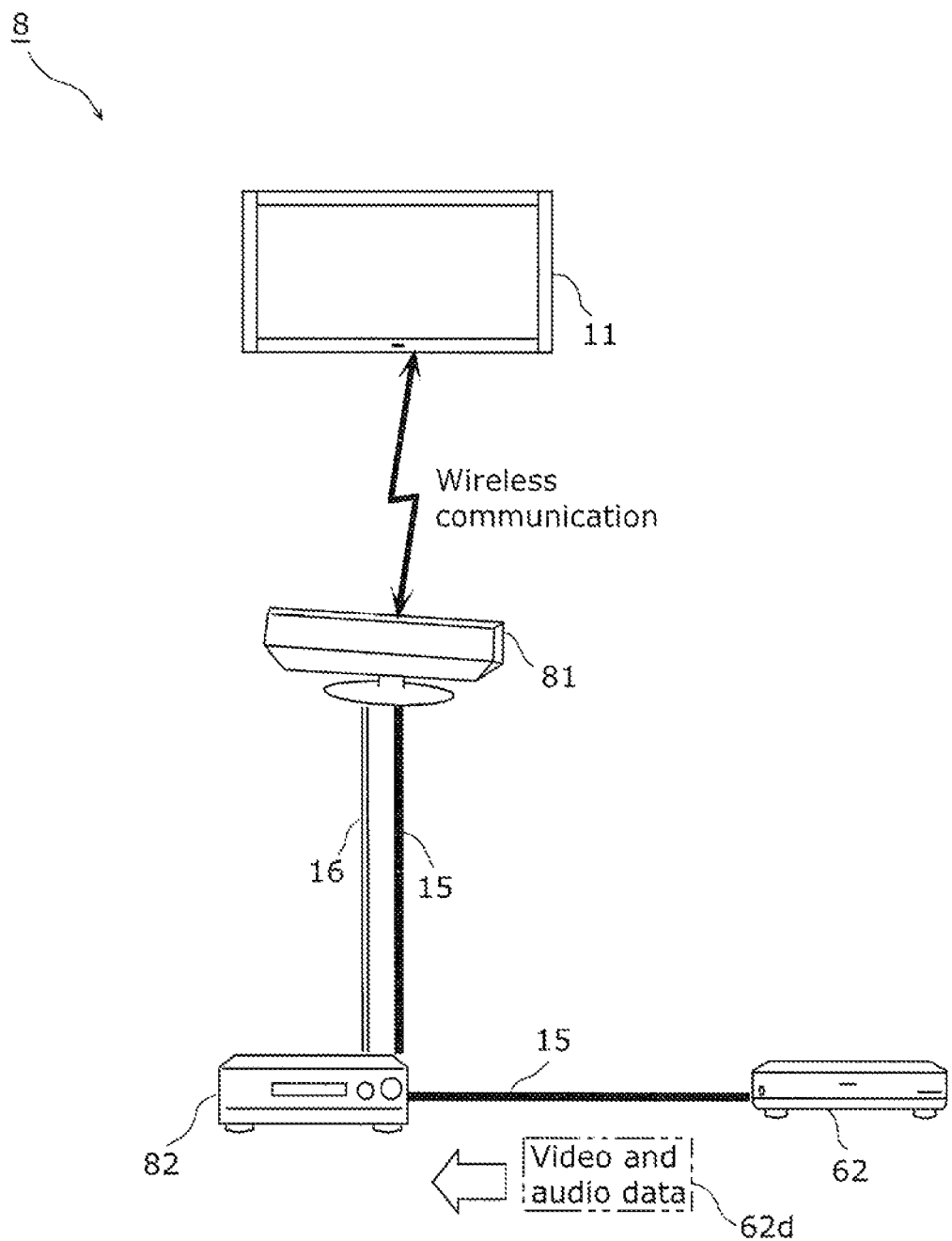
FIG. 8 is a diagram showing an example of a configuration of an AV device network using a wireless HDMI converter'having one HDMI input and an optical audio output.
Figure 9:
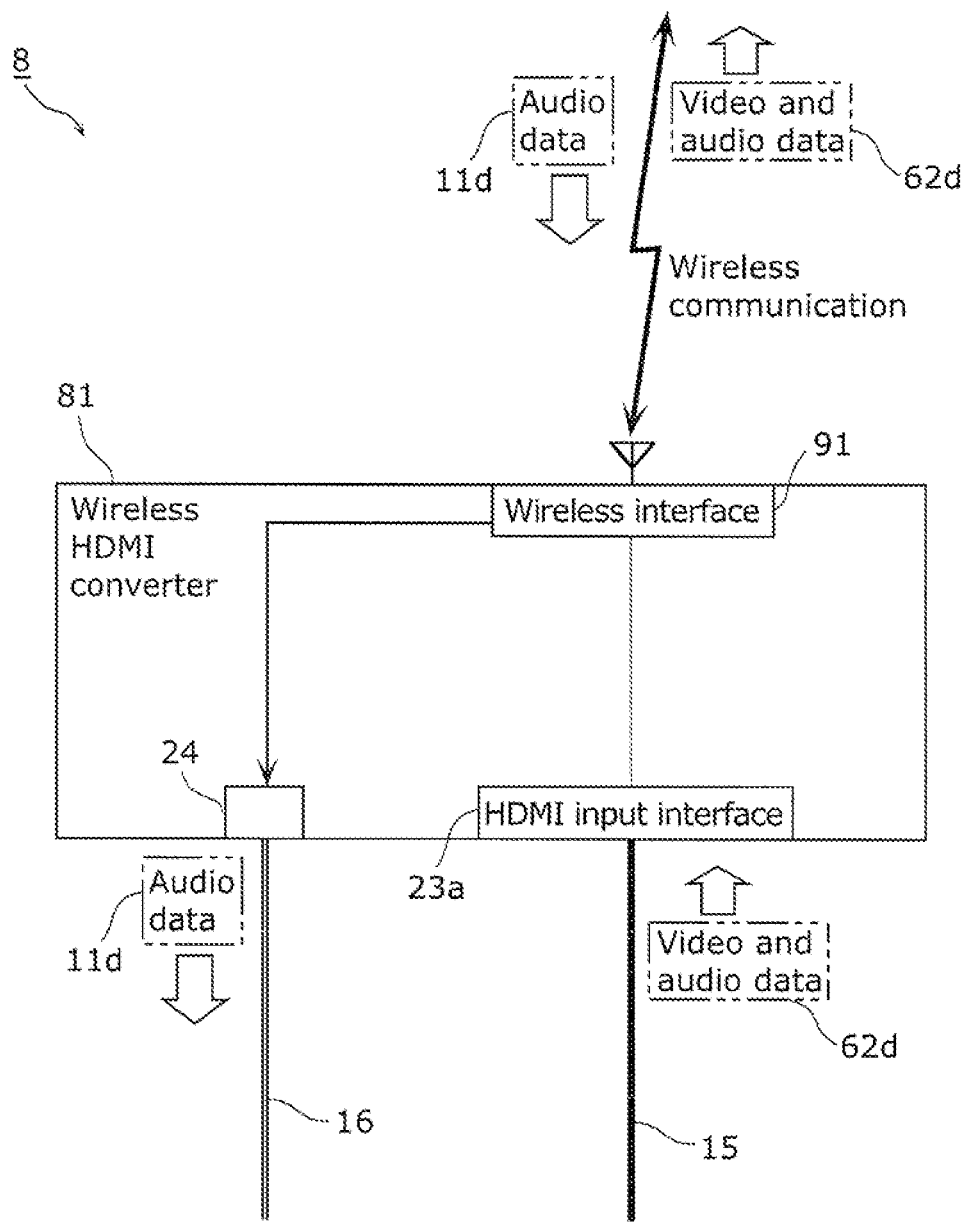
FIG. 9 is a diagram showing an example of a configuration of the wireless HDMI converter in FIG. 8.

In contrast, techniques for wireless communication without performing data compression are becoming popular in recent years. The wireless HD described earlier, for example, can be given as such a wireless communication (see FIG. 6, FIG. 7, and so on). For example, in wireless communication such as the wireless HD and so on, wireless transmission of HD video is performed by high-speed wireless communication of data having a large data amount, using radio waves in the 60 GHz band (see FIG. 6, FIG. 7, and so on). This makes the cable for wired communication unnecessary, and thus, even when the display device (TV 11 (see FIG. 6, FIG. 1, and so on)) is, for example, a wall-mounted television placed on a wall, there is no communication cable dangling on the wall, and thus the aesthetics from the viewpoint of the user is improved.

Specifically, in the embodiments, the wireless interface 22 (FIG. 1 to FIG. 5) may perform wireless communication with, for example, the display device (TV 11) through the wireless HD, and so on, and cause the wireless HDMI converter to perform the communication with the device (STB 13, and so on) connected by HDMI and the display device (TV 11), via such wireless communication.

However, in the conventional example (FIG. 10), even in the case where the video in the video and audio (the video and audio data 13*d* in FIG. 10) outputted by the video and audio output device (STB 13) is transmitted to the display device (TV 101 in FIG. 10), and the transmitted video is to be displayed, the display device (TV 101) extracts the audio (the audio data 101*d* in FIG. 10) from the video and audio of such video, and causes the audio output device (the home theater 14 in FIG. 10) to output the extracted audio. In other words, in the conventional example (FIG. 10), at the same time that the video (the video and audio data 13*d* in FIG. 10) is transmitted to the display device (TV 101), the audio data 101*d* is transmitted from the display device (TV 101) to the audio output device (the home theater 14).

In addition, with regard to wireless communication such as wireless HD, data having a large data amount is transmitted in the transmission of video, and thus transmission of other data (the audio data 101*d*, the audio data 11*d*) is restricted. As such, if such transmission of the audio data 101*d* from the display device (FIG. 10) were to be performed at the same time as the transmission of the video to the display device, using wireless communication such as wireless HD, and so on, the transmission may fail or the quality of transmission may deteriorate.

In view of this, in the wireless HDMI converter (the wireless HDMI converter 12) in the embodiments, the first interface (wireless interface 22) may perform the wireless communication with the television (TV 11), using wireless HD. Then, the video (the video and audio data 13*d* in FIG. 14) from the external transmitting device (STB 13) connected by HDMI to the wireless HDMI converter may be to be displayed on the television by wirelessly transmitting the video to the television (S2*b*1 (S2*b*), S3*b*1) (S3*b*) in FIG. 11).

Figure 11:
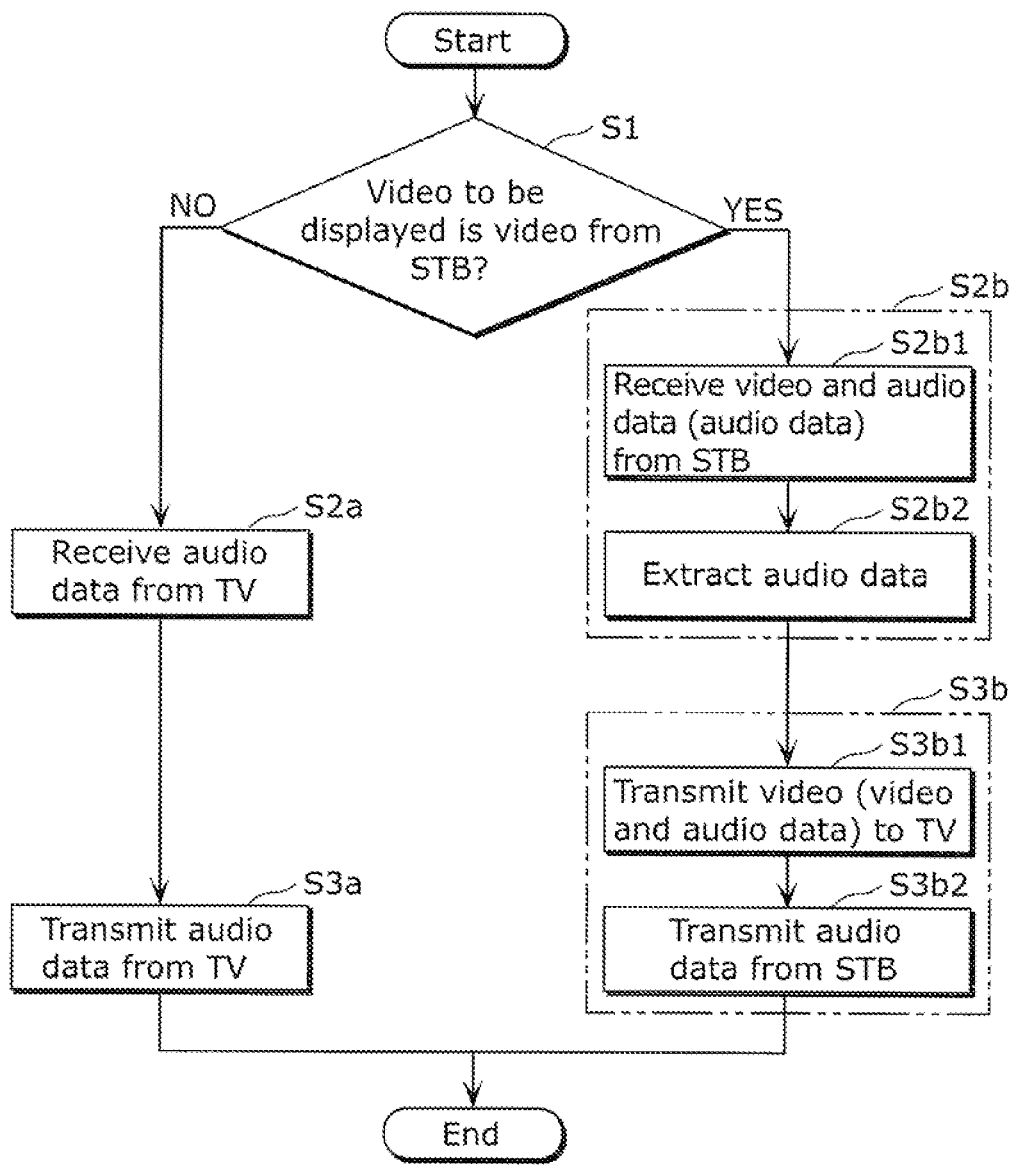
FIG. 11 is a flowchart of a wireless HDMI.

In addition, when video is to be wirelessly transmitted (FIG. 4, FIG. 11 S1: YES), the audio data extraction unit (audio data extraction unit 25) may obtain the video and audio (video and audio data 13d) of such video, and extract the audio (second audio data 11d2) from the obtained video and audio (S2b2).

Specifically, for example, the audio data extraction unit may obtain the aforementioned video and audio from a device, and so on, (for example, the STB 13) other than the display device, through communication other than the above-described wireless communication between the wireless HDMI converter and the display device. In addition, the audio data extraction unit may perform the above-described extraction from the video and audio obtained using the other communication.

Then, only in the case where the video will not be wirelessly transmitted (FIG. 3, S1: NO), the above-described first interface may receive the audio (the first audio data 11d1) from the television by wireless communication (S2a). Then, when the video will be wirelessly transmitted (FIG. 4, S1: YES), it is acceptable that the above-described first interface does not receive the audio (the first audio data 11d1) from the television by wireless communication.

Then, only in the case where the video will not be wirelessly transmitted (FIG. 3, S1: NO), the audio selector (audio selector 27) may cause the home theater to output the audio (the first audio data 11d1) received from the television (S3a). In other words, when the video will be wirelessly transmitted (FIG. 3, S1: YES), the home theater may be caused to output the audio (second audio data 112d) extracted by the audio data extraction unit (S3b2).

With this, when the video (the video and audio data 13d) is to be wirelessly transmitted (FIG. 4, S1: YES), the wireless communication (S2a) of audio (the audio data 11d) from the display device to the wireless HDMI converter is not performed, and thus the wireless communication of audio from the display device in concurrence with the wireless communication of the video is not performed thereby making it possible to avoid failure of wireless communication and improve the quality of wireless communication.

In addition, since the wireless communication for the audio (the second audio data 11d2) is not performed, it is possible to prevent delays in the timing for outputting the audio and eliminate the need for synchronizing the timing for the output of the audio.

It should be noted that, by wirelessly transmitting, to the television, the video and audio (the video and audio data 13d) transmitted to the wireless HDMI converter from the external transmitting device (STB 13), the first interface (wireless interface 22) may transmit the video of such video and audio to the television and cause the television to display the video.

In addition, the audio data extraction unit (audio data extraction unit 25), may obtain the video and audio received from the external transmitting device (STB 13), and extract the audio from the obtained video and audio.

It should be noted that the wireless HDMI converter may extract the video from the received video and audio (video and audio data 13d), and may wirelessly transmit, to the TV 11, only the extracted video out of the video and the audio of the received video and audio.

More specifically, for example, the wireless HDMI converter may be connected to each of plural devices (STB 13, home theater 14) by HDMI.

In addition, the first interface may perform wireless communication for the video from the specified device out of such plural devices. The specified device refers to, for example, a device specified by a signal (the control signal 11s, the CEC command 13c) received from (the receiving unit (wireless interface 22, control unit 21, CEC transmitting and receiving unit 53, control unit 52x) of) the wireless HDMI converter.

In addition, the audio data extraction unit may extract audio from the video and audio (the video and audio data 13da) from the specified device (STB 13).

Then, in the previously described case where the video is to be wirelessly transmitted (S1: YES), the audio selector may cause the home theater to output the extracted audio (the video and audio data 13da) from the specified device (STB 13).

Furthermore, the wireless HDMI converter may include more specifically, for example, an output unit (HDMI input interface 23b, and audio output unit 24x (FIG. 2)). In addition, the output unit may output audio to the external audio output device (home theater 14) connected by HDMI to the wireless HDMI converter. In such output, the audio (the first audio data 11d1) received from the television or the extracted audio (the second audio data 11d2) may be outputted through the audio return channel (ARC) in the HDMI.

It should be noted that one out of the HDMI input interface 23b and the optical output interface 24 (audio output unit 24x) may be selected by the control unit 21, and so on, and the audio may be outputted to the external audio output device (home theater 14) from the selected interface, or the audio output unit 24x may include only one out of the HDMI input interface 23b and so on and output from such included one.

It should be noted that the receiving unit (control unit 21, wireless interface 22, CEC transmitting and receiving unit 53, control unit 52x) may receive a signal (the control signal 11s, the CEC command 13c) indicating whether or not the video will be wirelessly transmitted.

It should be noted that, here, the wireless HDMI converters 12 and 51 may more specifically be, for example, a full high-vision wireless unit.

In addition, the audio output device may be, for example, a theater system such as a rack theater.

Furthermore, the display device may more specifically be a projector, or a liquid-crystal display connected to a computer.

Furthermore, the video and audio output device may more specifically be, for example, a BD player, or a camera such as a video camera, a monitoring camera, a digital still camera (DSC), a sensor camera, or a digital audio player (DAP) provided with a function for outputting video, or a cellular phone, or a computer such as a personal computer. Such computer may be, for example, a server which transmits video and audio to the wireless HDMI converter via a network such as the Internet.

Furthermore, the video and audio data 13d may be what is generally known as video which includes audio. In addition, the video and audio output device may be, for example, a video output device (storage device), such as a hard disk or a memory, which stores video (video and audio data 13d) and outputs the stored video to the (wireless) HDMI converter.

In this manner, in the wireless HDMI converters (wireless HDMI converter 12 and 51) in the embodiments, constituent elements such as the selector 27 are combined, and a synergistic effect of the combination is produced. In contrast, in the conventional example, all or part of these constituent elements is lacking and thus the synergistic effect is not produced. The wireless HDMI converter is different from the conventional example in terms of this point.

It should be noted that constituent elements described in mutually separated locations, such as constituent elements described in different embodiments, may be combined as appropriate.

Furthermore, with regard to minor elements, any configuration may be adopted, and, for example, a configuration other than the configuration described above may be adopted. Other configurations may be, for example, a configuration that may be easily conceived by a person of ordinary skill in the art, or a hard-to-conceive configuration in which a further improvement invention is applied. Both cases, so long as they are applied to the present invention, are included in the scope of the present invention.

It should be noted that the present invention may be implemented using a computer program for implementing the respective functions of the wireless HDMI converter, a storage medium in which such computer program is stored, an integrated circuit on which the respective function blocks are mounted, as well as other forms. A method including the respective steps described above may also be used.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to an AV device network in which audio to be outputted from a device that is used for the current viewing is automatically selected in the case where devices such as a TV, STB, home theater, and so on, are connected via wireless communication.

What is claimed is:

1. An input and output switching device comprising:
a first interface which is connected to an external transmitting and receiving device, and at least transmits video data to, and receives audio data and a control signal from, the connected external transmitting and receiving device;
a second interface which is connected to an external transmitting device, and at least receives video and audio data from the external transmitting device;
a third interface which is connected to an external audio output device, and transmits audio data;
an audio selector which switches a path through which the audio data is to be transmitted to the external audio output device;
a controller that instructs said audio selector to switch the path, based on the control signal received by said first interface; and
an audio data extractor that extracts audio data from the video and audio data received by said second interface,
wherein, when a first instruction signal for selecting said first interface is received as the control signal:
(a-i) said first interface receives the audio data from the external transmitting and receiving device, and outputs the received audio data to said audio selector;
(a-ii) said controller issues, to said audio selector, a first input selection instruction for selecting said first interface as an input of said audio selector;
(a-iii) said audio selector outputs, to said third interface, the audio data outputted from said first interface, when the first input selection instruction is received from said controller; and
(a-iv) said third interface outputs, to the external audio output device, the audio data outputted by said audio selector, and when a second instruction signal for selecting said second interface is received as the control signal:
(b-i) said second interface receives the video and audio data from the external transmitting device, and outputs the received video and audio data to said audio data extractor;
(b-ii) said audio data extractor extracts the audio data from the video and audio data received from said second interface, and outputs the extracted audio data to said audio selector;
(b-iii) said controller issues, to said audio selector, a second input selection instruction for selecting said second interface as the input of said audio selector;
(b-iv) said audio selector outputs, to said third interface, the extracted audio data outputted from said audio data extractor, when the second input selection instruction is received from said controller;
(b-v) said third interface outputs, to the external audio output device, the audio data outputted from said audio selector; and
(b-vi) said first interface outputs, to the external transmitting and receiving device, the video and audio data received from the external transmitting device,
said first interface receives the audio data from the external transmitting and receiving device only when the video data is not to be transmitted from said first interface to the external transmitting and receiving device, and does not receive the audio data when the video data is to be transmitted from said first interface to the external transmitting and receiving device, and
said audio selector causes the external audio output device to output the audio data received from the external transmitting and receiving device only when the video data is not to be transmitted from said first interface to the external transmitting and receiving device, and causes the external audio output device to output the audio data extracted by said audio data extractor when the video data is to be transmitted from said first interface to the external transmitting and receiving device.

2. The input and output switching device according to claim 1, comprising:
at least two sets of said second interface and said audio data extractor; and
a video and audio selector which switches a path for the video and audio data,
wherein, when a set selection instruction for selecting a set by selecting said second interface in either of the at least two sets is received as the control signal:
(c-i) said second interface in the set selected according to the received set selection instruction receives the video and audio data from said external transmitting device, and outputs the received video and audio data to said audio data extractor in the selected set;
(c-ii) said audio data extractor in the selected set extracts the audio data from the video and audio data received from said second interface in the selected set, and outputs the extracted audio data to said audio selector;
(c-iii) said controller issues, to said audio selector, an instruction for selecting said second interface in the selected set as the input of said audio selector, and issues, to said video and audio selector, an instruction to select the second interface of the selected set as an input of said video and audio selector;
(c-iv) said audio selector outputs, to said third interface, the audio data outputted from said audio data extractor that received the video and audio data from said second interface selected according to the instruction from said controller;

(c-v) said third interface outputs, to the external audio output device, the audio data outputted by said audio selector;

(c-vi) said video and audio selector outputs, to said first interface, the video and audio data from said second interface selected according to the instruction from said controller; and (c-vii) said first interface outputs, to the external transmitting and receiving device, the video and audio data received from said video and audio selector.

3. The input and output switching device according to claim 1, further comprising
a command transmitting and receiving unit configured to transmit and receive a device control command, via said second interface,
wherein, upon receiving an input and output switching command as the device control command, said command transmitting and receiving unit is configured to instruct said controller to select, as an input, a second interface to which a transmission source device of the input and output switching command is connected, among a plurality of said second interfaces included in said input and output switching device, and
when instructed by said command transmitting and receiving unit to select said second interface of the transmission source device as the input, said controller performs a same operation as an operation performed when the second instruction signal for selecting said second interface of the transmission source device is received as the control signal.

4. The input and output switching device according to claim 1, wherein said second interface is a high-definition multimedia interface (HDMI).

5. The input and output switching device according to claim 1, wherein said first interface is an interface for wireless communication.

6. The input and output switching device according to claim 3, wherein the input and output switching command is a consumer electronics control (CEC) command transmitted by the external transmitting device.

7. An input and output switching device comprising:
a first interface which is wirelessly connected to an external transmitting and receiving device, and at least transmits video data to, and receives audio data and a control signal from, the connected external transmitting and receiving device;
a second interface which is connected to an external transmitting device, and at least receives video and audio data from the external transmitting device;
a third interface which is connected to an external audio output device, and transmits audio data;
an audio selector which switches a path through which the audio data is to be transmitted to the external audio output device;
a controller that instructs said audio selector to switch the path, based on the control signal received by said first interface; and
an audio data extractor that extracts audio data from the video and audio data received by said second interface,
wherein, when a first instruction signal for selecting said first interface is received as the control signal:
(a-i) said first interface receives the audio data from the external transmitting and receiving device, and outputs the received audio data to said audio selector;
(a-ii) said controller issues, to said audio selector, a first input selection instruction for selecting said first interface as an input of said audio selector;
(a-iii) said audio selector outputs, to said third interface, the audio data outputted from said first interface, when the first input selection instruction is received from said controller; and
(a-iv) said third interface outputs, to the external audio output device, the audio data outputted by said audio selector, and
when a second instruction signal for selecting said second interface is received as the control signal:
(b-i) said second interface receives the video and audio data from the external transmitting device, and outputs the received video and audio data to said audio data extractor;
(b-ii) said audio data extractor extracts the audio data from the video and audio data received from said second interface, and outputs the extracted audio data to said audio selector;
(b-iii) said controller issues, to said audio selector, a second input selection instruction for selecting said second interface as the input of said audio selector;
(b-iv) said audio selector outputs, to said third interface, the extracted audio data outputted from said audio data extractor, when the second input selection instruction is received from said controller;
(b-v) said third interface outputs, to the external audio output device, the audio data outputted from said audio selector; and
(b-vi) said first interface outputs, to the external transmitting and receiving device, the video and audio data received from the external transmitting device,
wherein the external transmitting and receiving device is a television which displays high-definition (HD) video,
said external audio output device outputs audio included in video and audio which includes the video to be displayed,
said input and output switching device is a wireless high-definition multimedia interface (HDMI) converter,
said first interface performs wireless communication with the television using wireless HD, and causes the television to display video of the video data from the external transmitting device connected to said wireless HDMI converter using the HDMI, by wirelessly transmitting the video data of the video to the television,
said audio data extractor, when the video data is to be wirelessly transmitted, obtains the video and audio data including the video data, and extract extracts the audio data from the obtained video and audio data,
said first interface receives the audio data from the television by the wireless communication only when the video data is not to be wirelessly transmitted, and does not receive the audio data when the video data is to be wirelessly transmitted, and
said audio selector causes the external audio output device to output the audio data received from the television only when the video data is not to be wirelessly transmitted, and causes the external audio output device to output the audio data extracted by said audio data extractor when the video data is to be wirelessly transmitted.

8. The input and output switching device according to claim 7,
wherein said first interface transmits, to the television, the video data included in video and audio data received by said wireless HDMI converter from the external transmitting device, by wirelessly transmitting the video and audio data to the television, and causes the television to display the video of the transmitted video data, and
said audio data extractor obtains the video and audio data received from the wireless HDMI converter, and extracts the audio data from the obtained video and audio data.

9. The input and output switching device according to claim 8,
wherein said wireless HDMI converter is connected to a plurality of devices using the HDMI,
said first interface wirelessly transmits the video data from a device specified by a signal received by said wireless HDMI converter, from among the devices,
said audio data extractor extracts the audio data from the video and audio data from the specified device, and
said audio selector causes the external audio output device to output the extracted audio data from the specified device, when the video data is to be wirelessly transmitted.

10. The input and output switching device according to claim 9, further comprising
an output unit configured to output the extracted audio data or the audio data received from the television through an audio return channel (ARC) of the HDMI, to the external audio output device connected to said wireless HDMI converter using the HDMI.

11. An input and output switching method performed by an input and output switching device that includes:
a first interface which is connected to an external transmitting and receiving device, and at least transmits video data to, and receives audio data and a control signal from, the connected external transmitting and receiving device;
a second interface which is connected to an external transmitting device, and at least receives video and audio data from the external transmitting device;
a third interface which is connected to an external audio output device, and transmits audio data;
an audio selector which switches a path through which the audio data is to be transmitted to the external audio output device;
a controller that instructs the audio selector to switch the path, based on the control signal received by the first interface; and
an audio data extractor that extracts audio data from the video and audio data received by the second interface,
said input and output switching method comprising:
(a) the following performed when a first instruction signal for selecting the first interface is received as the control signal:
(a-i) receiving the audio data from the external transmitting and receiving device, and outputting the received audio data to the audio selector, performed by the first interface;
(a-ii) issuing a first input selection instruction to the audio selector performed by the controller, the first input selection instruction being for selecting the first interface as an input of the audio selector;
(a-iii) outputting the audio data outputted from the first interface, to the third interface, performed by the audio selector, when the first input selection instruction is received from the controller; and
(a-iv) outputting the audio data outputted by the audio selector, to the external audio output device, performed by the third interface; and
(b) the following performed when a second instruction signal for selecting the second interface is received as the control signal:
(b-i) receiving the video and audio data from the external transmitting device, and outputting the received video and audio data to the audio data extractor, performed by the second interface;
(b-ii) extracting the audio data from the video and audio data received from the second interface, and outputting the extracted audio data to the audio selector, performed by the audio data extractor;
(b-iii) issuing a second input selection instruction to the audio selector, performed by the controller, the second input selection instruction being for selecting the second interface as the input of the audio selector;
(b-iv) outputting the extracted audio data to the third interface, performed by the audio selector, when the second input selection instruction is received from the controller, the extracted audio data being outputted from the audio data extractor;
(b-v) outputting the audio data outputted from the audio selector, to the external audio output device, performed by the third interface; and
(b-vi) outputting the video and audio data received from the external transmitting device, to the external transmitting and receiving device, performed by the first interface,
wherein the first interface receives the audio data from the external transmitting and receiving device only when the video data is not to be transmitted from the first interface to the external transmitting and receiving device, and does not receive the audio data when the video data is to be transmitted from the first interface to the external transmitting and receiving device, and
the audio selector causes the external audio output device to output the audio data received from the external transmitting and receiving device only when the video data is not to be transmitted from the first interface to the external transmitting and receiving device, and causes the external audio output device to output the audio data extracted by the audio data extractor when the video data is to be transmitted from the first interface to the external transmitting and receiving device.

* * * * *